May 24, 1966   P. P. JOHNSON ETAL   3,252,579
LAUNDRY EXTRACTOR WITH SELF-EMPTYING BALANCING TANK MEANS
Filed July 24, 1961   2 Sheets-Sheet 1
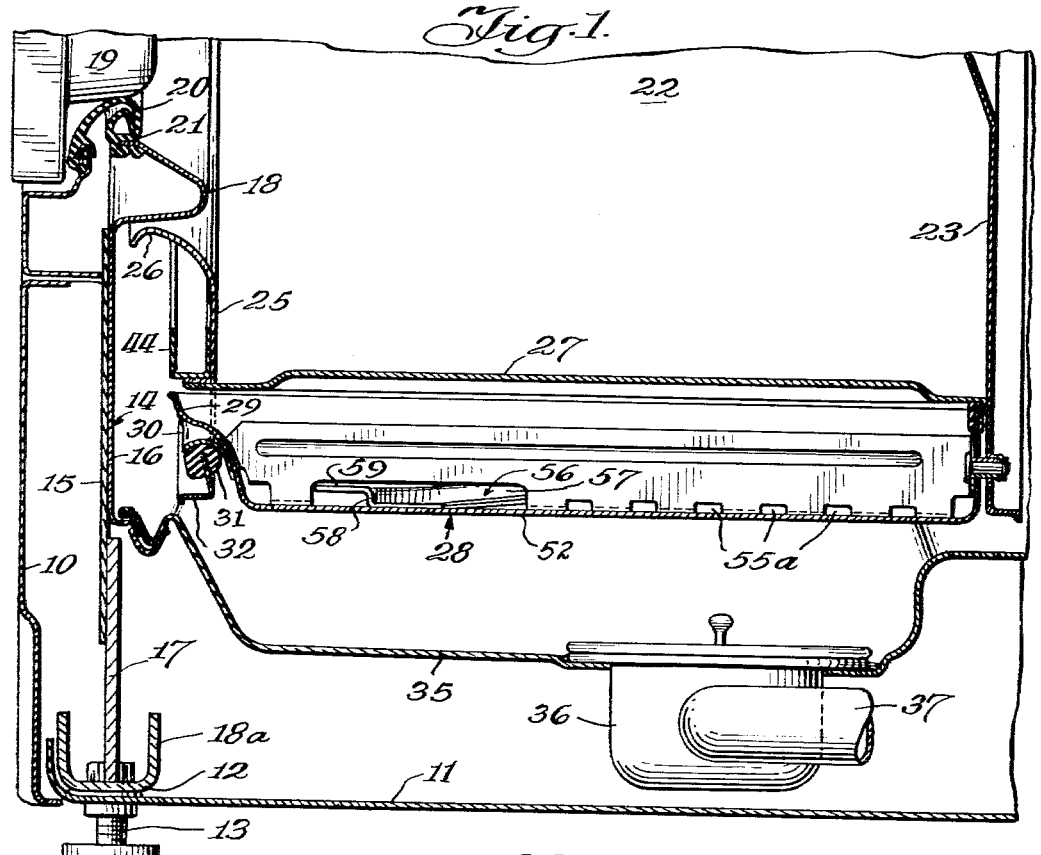
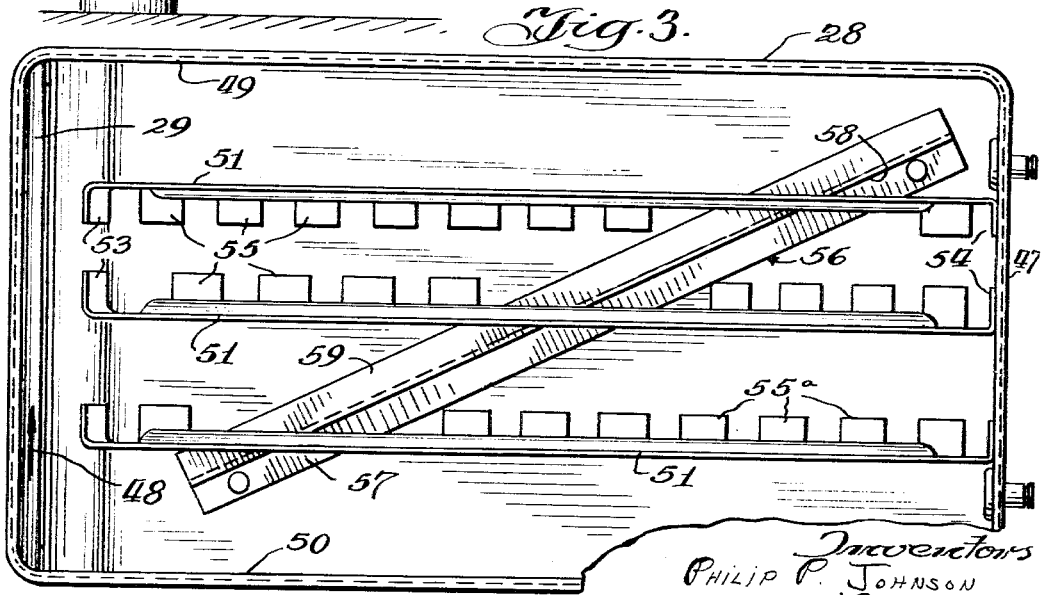
Inventors
Philip P. Johnson
Frederick L. Donnell
By Hoffman, Brady, Wegner, Allen & Stellman
Attorneys May 24, 1966    P. P. JOHNSON ETAL    3,252,579
LAUNDRY EXTRACTOR WITH SELF-EMPTYING BALANCING TANK MEANS
Filed July 24, 1961    2 Sheets-Sheet 2

United States Patent Office 3,252,579
Patented May 24, 1966

3,252,579
LAUNDRY EXTRACTOR WITH SELF-EMPTYING BALANCING TANK MEANS
Philip P. Johnson, Bridgman, and Frederick L. Donnell, Stevensville, Mich., assignors to Whirlpool Corporation, a corporation of Delaware
Filed July 24, 1961, Ser. No. 126,012
5 Claims. (Cl. 210—363)

This invention relates to a balancing apparatus for a washer-dryer combination laundry appliance.

In certain types of laundry appliances of the above-described type the drum containing the load of clothes is adapted to spin at high speeds during the extraction of water from the wet load. This load is practically always out of balance and the balance conditions change as the water is extracted from the load. Without compensating for this out-of-balance condition, severe vibration forces would be set up in the drum. It has been proposed that balancing tanks be provided associated with the drum with means for introducing balancing liquid into these tanks to compensate for changing unbalanced conditions.

It has been found that when using balance tanks and injecting liquid into them to balance unbalanced loads in the rotating drum that it is very difficult to drain all of the balancing liquid from these balance tanks at the conclusion of the extraction cycle. Even when the drum is rotating at a tumble speed of approximately 45 r.p.m. such as during the drying cycle, the balance tanks do not remain in a position above the horizontal centerline of the laundry machine for a long enough time period to allow the liquid to drain by gravity from the tanks. In addition to undesirable noises produced by the retained balancing liquid "sloshing" back and forth in the balance tanks during the tumble dry cycle, a much more serious problem arises during the next extraction cycle if balancing liquid remains in the balance tanks. This problem arises from the fact that this retained liquid in the balance tank or tanks adjacent the unbalanced clothes load actually adds to the unbalanced condition or even creates an unbalanced condition in the case of a balanced clothes load. This is especially true when the wash cycle consists of several consecutive rinse and extraction cycle portions and the time period between these cycle portions is not long enough to allow the balance tanks to effectively drain. These conditions make it very desirable to provide means to completely and rapidly drain all of the balance tanks after the extraction cycle.

The present invention provides a balancing apparatus in which substantially all of this last small portion of balancing liquid is removed from the balancing tanks at the conclusion of the extraction cycle.

Other features of the invention will be apparent from the following description taken in conjunction with the accompanying drawings. Of the drawings:

FIGURE 1 is a fragmentary sectional elevational view of the bottom portion of a combination washer-dryer home appliance embodying the invention.

FIGURE 3 is a plan detail view of the balancing tank of this invention.

Figure 2:
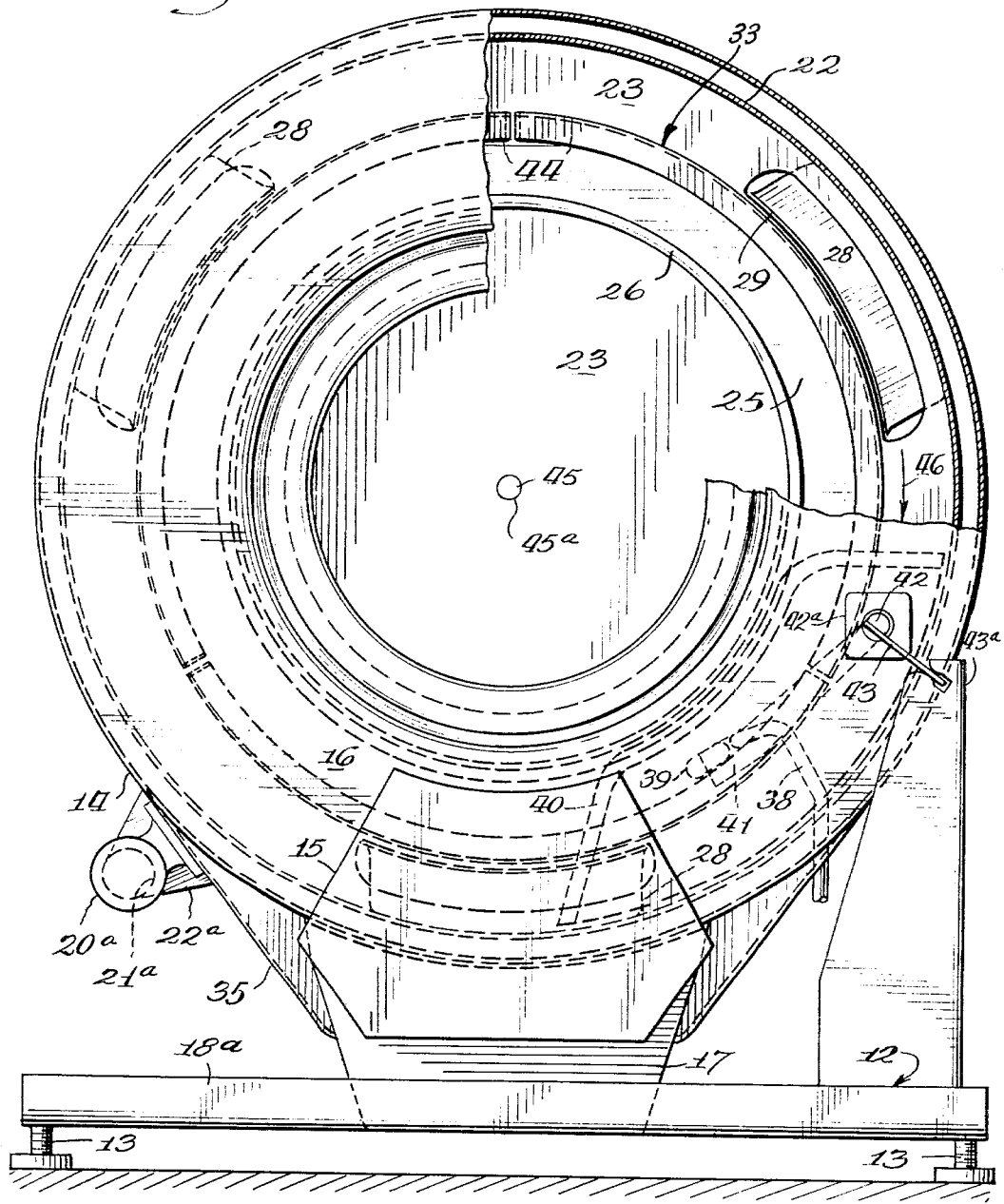
FIGURE 2 is a front elevational view with portions broken away of the laundry appliance of FIGURE 1 but with the outer cabinet removed.

The invention is illustrated in conjunction with a washer-dryer combination domestic laundry appliance of the type illustrated in greater detail in the William F. Scott et al. copending patent application Serial No. 97,899 filed March 23, 1961, now U.S. Patent No. 3,190,447, and assigned to the same assignee as the present invention.

This washer-dryer combination in the lower fragmentary vertical section in FIGURE 1 comprises an outer cabinet 10, a bottom panel 11 forming a part of the cabinet and a base frame 12 supported on spaced legs 13 which are adjustable. Inwardly of the cabinet 10 is located a casing 14 that is supported by front plate member 15 attached as by welding to the casing front wall 16. The plate member 15 is itself supported as by bolting or welding plate member 17 that extends upwardly from a channel 18a, that is part of the base frame 12.

An access opening is provided in the casing front wall 16 with this opening being defined by a circular inwardly extending rib 18 formed in the sheet metal front wall 16. The opening formed by the rib 18 is adapted to be closed by a door 19 which seats against a flexible gasket 20 that is attached to the edge of the casing front wall 16 that defines the access opening 21.

Rotatably mounted within the casing 14 is a perforated drum 22 (the perforations not shown) with the drum having a rear wall 23 located inwardly of the casing rear wall (not shown). The drum is also provided with a front wall 25 having an outwardly extending annular mouth 26 surrounding the casing rib 18. As illustrated, the perforated drum 22 contains spaced imperforate wall portions 27 on its periphery opposite which are located liquid balancing receptacles 28 whose structure and operation are described in greater detail in the above-mentioned copending Scott et al. application. These balancing receptacles each include a forwardly extending spout 29 and a bracket member 30 that bears against a gasket 31 held by a flange member 32 that is part of the drum front wall 25. Immediately inwardly of the spout 29 are collector segments 44 also mounted as by welding on this front wall 25.

A motor and transmission assembly 20a is attached to the casing 14. A drive belt 22a is wrapped around an outlet pulley 21a of the motor and transmission assembly 20a to drive a pulley (not shown) that is connected to drive the drum 22 at a tumble speed for the washing and drying portions of the total machine cycle and at an extraction speed to extract liquid contained in the clothes load prior to the tumble drying portion of the cycle.

The casing 14 includes a bottom 35 in which is located a foreign articles trap 36. The trap functions to separate foreign articles from liquid flowing from the casing 35 and discharges the liquid from the trap and out an exhaust conduit 37 to a pump (not shown).

As can be seen in FIGURE 2, the bottom 35 of the casing 14 extends downwardly a considerable distance to form a sump. Immediately in front of this sump is positioned the front plate member 15 for supporting the casing 14 and it in turn is attached to the plate number 17 which itself is attached to channel member 18a of the base frame 12. To the upper right of this combination of plate member 15 and leg 17 is provided a nozzle 38 which is supplied with liquid from a pump (not shown) that draws the liquid through the exit conduit 37 from the sump 35, as shown in FIGURE 1. This nozzle 38 is adapted to project liquid through a target hole 39 of a splash housing 40 mounted on the inside of wall 16 of casing 14. The access of liquid from the nozzle 38 to the target hole 39 is controlled by a movable deflector 41 that is moved from and to liquid intercepting position of liquid from the nozzle 38 by vibration of the drum 22 during its spinning. This deflector is mounted on a pivot pin 42 which in turn is mounted in a housing 42a on the wall 16 of casing 14 and is held in a normally liquid obstructing position by a leaf spring member 43.

The end of leaf spring member 43 is clamped into a rigid member 43a that is securely mounted as by bolting or welding to the channel member 18a of the base frame 12. When an off-balanced load is rotated at high speed in the drum 22 which in turn is mounted in bearings in the rear wall (not shown) of the casing 14, the drum 22 and casing 14 will deflect or vibrate with respect to the base frame 12. When the casing deflects to the right as shown in FIGURE 2, the leaf spring member 43, which is attached to the shaft 42, is compressed or buckles to rotate the shaft 42 clockwise. This clockwise rotation moves the deflector 41 upwardly but not enough, because of the design of the deflector 41, to allow the liquid emanating from the nozzle 38 to pass through the target hole 39 in the splash housing 40, thus balancing liquid is not introduced into the balance tanks 28 upon deflections of the drum 22 and casing to the right as shown in FIGURE 2. As viewed in FIGURE 2, the drum 22 rotates clockwise indicated by the numeral 46. However, when deflection of the drum 22 and the casing 14 is to the left, the leaf spring member 43 is placed in tension and rotates the shaft 42 counter-clockwise driving the deflector 41 downwardly to allow the liquid emanating from the nozzle 38 to pass over the top of the deflector 41 and through the target hole 39 in the splash housing 40.

The liquid that is projected from the nozzle 38 through the opening 39 when the vibration of the drum moves the flange downwardly is collected in the collector segments 44 which have their closed ends adjacent and aligned to make up a circular ring 33 that is concentric with the axis 45 of spinning of the drum. Central axis 45 is defined by the centerline of the drum shaft 45a (FIGURE 1) that is attached to the rear wall 23 of the drum 22 and is mounted (not shown) in bearings on the rear wall of the casing 14. A pulley (not shown) is mounted on the shaft 45a and is driven by the drive belt 22a to drive the drum 22. As can be seen, each collector segment 44 has its own balancing tank 28. The description and operation of the balancing system forms no part of the present invention as it is fully described and claimed in the above William F. Scott et al. application to which reference is made.

Each balancing tank 28 is illustrated in detail in FIGURES 1 and 3. As can be seen here, each tank 28 is generally rectangular and has a front or spout end 29 and a rear end 47. The front end 29 is the common liquid introduction and liquid exhaust end receiving liquid from its collector segment 44 during the high speed spinning of an unbalanced load in the drum 22 and discharging liquid when the drum is decelerated toward a low speed state or condition. When the drum 22 is rotated in a clockwise direction, as viewed in FIGURE 2 and as shown by the arrow 46, during the normal operation of the apparatus, the balancing tanks 28 move in the direction indicated by the arrow 48 in FIGURE 3. Each balancing tank therefore has a leading edge 49 and a trailing edge 50.

Located within each balancing tank 28 are a plurality of spaced upstanding baffles 51 here shown as three in number. These baffles are mounted on the bottom 52 of the tank which is of course the side of the tank furthest from the central axis 45. Each baffle is constructed of sheet metal and is provided with end flange portions 53 and 54 for attaching to the spout end 29 and rear end 47, respectively. Each baffle is also provided with bottom flanges 55 for attaching as by welding to the bottom 52 of the tank. Between these bottom flanges 55 are located restricted openings 55a through which balancing liquid can flow but cannot surge. These restricted openings permit the balancing liquid to assume a substantially uniform depth over the bottom 52 of the tank but prevent rapid shifting of the liquid during changes in acceleration and deceleration during rotation of the drum 22.

The baffles therefore by preventing the surging transverse movement of the balancing liquid, which functions like an unbalanced load, substantially eliminate false vibration signals that would adversely affect operation of the balancing mechanism. The surging movements of balancing liquid within the tanks where the baffles are not used is caused by changes in acceleration forces on the liquid during the normal operation of the appliance.

Thus, when the appliance is operating and a balancing tank is at the bottom of the appliance, as illustrated in FIGURE 2, the liquid level tends to be substantially uniform. However, as the drum rotates to move the tank from this bottom position, there is a tendency of the liquid due to gravity to shift toward the trailing edge 50 of the tank and this tendency increases as the tank is raised from this bottom position.

Then, when the tank passes the vertical position and starts down the other side, gravity tends to force the liquid toward the leading edge 49. Without the baffles which extend transversely of the direction of rotation, these changes of liquid level can become rapid and erratic, especially at lower extraction speeds to set up false vibration signals. Naturally, the gravity effect is more pronounced at the lower extraction speed while the drum is accelerating to its maximum extraction speed.

FIGURES 1 and 3 of the drawings illustrate a scoop or guide member 56. This scoop member 56 which is diagonally mounted on the bottom 52 of the balancing tanks 28 is arranged at an angle to the direction of spin from adjacent the leading edge 49 to adjacent the trailing edge 50. In the illustrated embodiment the scoop or member 56 extends from adjacent the corner formed by the leading edge 49 and the rear edge 47 to adjacent the corner formed by the trailing edge 50 and the spout or front edge 29. The scoop member 56 comprises a flange 57 which is attached as by welding to the bottom 52 of the tank, an upstanding liquid intercepting portion 58 and a forwardly extending scoop portion 59 spaced from the bottom 52 of the tank and extending generally toward the leading edge 49. This scoop member serves to rapidly promote the draining or dumping of the last small volume of liquid from the balancing tanks when the drum is decelerated toward a stationary state or condition.

The member 56 aids in removing substantially all of the balancing liquid from the tank. As the drum slows down balancing liquid in the tank gathers along the leading edge 49 when the tank moves from the top position toward the bottom position as viewed in FIGURE 2. Then, when the tank passes the bottom position the liquid tends to shift from the leading edge 49 toward the trailing edge 50. If it were not for the member 56 this liquid, and especially the liquid toward the rear wall of the balanced tank, would spread in a thin layer over the bottom of the tank and would be very difficult to remove as this small volume would not gather enough momentum to be forced out the spout 29. However, with the guide or scoop member 56 this movement of the remaining small volume of liquid from the leading edge to the trailing edge is intercepted or scooped up by the liquid intercepting portion 58 and guides this small portion of liquid toward the spout 29 by reason of the inclination of the guide member 56. The guide member actually accelerates this remaining portion of liquid from the closed end of the tank toward the spout 29 to be drained from the balance tank. As the drum continues to rotate eventually all of the liquid is intercepted and substantially all of it is accelerated toward and out the spout 29 in the emptying end of the tank.

The balancing tank with baffles is claimed in the Alvin E. Burkall et al. copending application Serial No. 126,941, filed July 26, 1961, and assigned to the same assignee as the present application.

Having described our invention as related to the embodiment shown in the accompanying drawings, it is our intention that the invention be not limited by any of the details of description, unless otherwise specified, but rather be construed broadly within its spirit and scope as set out in the accompanying claims.

We claim:
1. In a laundry extractor having a clothes receiving drum spinnable by motive means in a preselected direction of rotation about an axis for the extraction of water from clothes placed in said drum, balancing apparatus for said drum including a plurality of balancing tanks circumferentially spaced at the periphery of the drum, each tank being adapted to receive and contain a balancing lquid and having a radially outer side, a leading edge and a trailing edge with respect to said preselected direction of rotation of said drum, and opposite ends with respect to the direction parallel to said axis, and an emptying outlet from which balancing liquid flows when said drum is rotated at less than a preselected speed, said outlet being disposed at one of said ends of each tank and being arranged to preclude discharge of balancing liquid therefrom when said drum is spinning at high water-extracting speeds, and baffle means in each tank on the radially outer side thereof for directing balancing liquid axially toward said one end of each tank for flow outwardly through said outlet as a result of movement of water relative to said baffle means caused by a rotation of said drum in said preselected direction at a speed less than said preselected speed such as in slowing the drum rotation upon completion of a water extraction operation.

2. The laundry apparatus of claim 1 wherein the baffle defines with said radially outer side of each tank a trough having an outlet portion adjacent said emptying outlet of each tank.

3. The laundry apparatus of claim 1 wherein the baffle comprises a wall projecting inwardly from said radially outer side of each tank.

4. The laundry apparatus of claim 1 wherein the baffle extends substantially rectilinearly from end to end of each tank.

5. The laundry apparatus of claim 1 wherein the baffle comprises a scoop member extending from adjacent said one end of each tank at said trailing edge thereof to adjacent the opposite end of each tank at said leading edge thereof.

References Cited by the Examiner

UNITED STATES PATENTS

| 2,538,246 | 1/1951 | Holm-Hansen | 210—363 |
| 2,539,533 | 1/1951 | Douglas | 210—363 |
| 2,836,301 | 5/1958 | Bruckman | 210—363 |
| 3,080,059 | 3/1963 | Scott et al. | 210—144 |

REUBEN FRIEDMAN, *Primary Examiner.*

HERBERT L. MARTIN, *Examiner.*

J. DE CESARE, C. R. REAP, *Assistant Examiners.*